Patented June 14, 1938

2,120,417

UNITED STATES PATENT OFFICE 2,120,417

ART OF PREPARING VISCOSE

George A. Richter, Berlin, N. H., assignor to Brown Company, Berlin, N. H., a corporation of Maine No Drawing. Application June 25, 1937, Serial No. 150,323

11 Claims. (Cl. 260—100)

This invention relates to the art of preparing viscose or cellulose xanthate solution. It deals more particularly with a process involving the admixture of carbon bisulphide with a suspension of cellulose in caustic soda solution to produce the desired viscose or cellulose xanthate solution.

In preparing viscose or cellulose xanthate solution by a so-called one-step process wherein all the ingredients, including the cellulose, caustic soda, water, and carbon bisulphide, are admixed in a single operation in proportions calculated to yield viscose syrup of the desired composition, it has been determined that, unless the cellulose entering into such process is of appropriately low solution viscosity, the process will not yield viscose of the desired freedom from unxanthated or residual cellulose, especially when the ingredients are used in proportions calculated to yield viscose syrup of a causticity and cellulose content of about 6% to 10% each, such as is usually requisite for the manufacture of artificial silk, films, and other ultimate products. Accordingly, as disclosed in my Patent No. 2,076,596, the cellulose employed in such one-step xanthating process is of a solution viscosity or xanthatability suitable for such purpose.

In accordance with the present invention, the admixture of carbon bisulphide with a suspension of cellulose in caustic soda solution to produce viscose or cellulose xanthate solution of the desired composition is preceded by the treatment of the cellulose with a solution of an oxidant, preferably sodium hypochlorite, under conditions of time and temperature ensuring a substantial consumption or exhaustion of the oxidant by reaction on the cellulose before the carbon bisulphide, caustic soda, and other ingredients to participate in the one-step xanthating reaction are admixed with the cellulose still associated with the reaction products of the oxidant. It is distinctly preferable that a large portion, if not substantially all, of the caustic soda to participate in the xanthating reaction be used in the pretreatment of the cellulose and thus serve to minimize the degrading or oxidizing effect of the oxidant on the cellulose, especially when the pretreatment is effected at elevated temperature so as to accelerate the consumption of the oxidant. By using an oxidant in the pretreatment of the cellulose, it becomes possible to employ successfully in a one-step xanthating process those cellulose fibers or wood pulps which, by reason of unduly high viscosity, are resistant to the desired substantially complete xanthation and dissolution by such process. The amount of oxidant employed in the pretreatment may vary, depending upon the solution viscosity of the cellulose used as raw material. Thus, the higher the viscosity of such cellulose, the more the amount of oxidant necessary in the pretreatment to render the cellulose satisfactorily xanthatable to form viscose of the desired quality and composition. The amount of oxidant used in the pretreatment also varies with the causticity and/or cellulose content desired in the viscose. It is to be understood, therefore, that the present invention comprehends the use of various amounts of oxidant in the pretreatment and the production of viscose syrups of various compositions, even though it is especially applicable in the preparation of viscose syrups of a causticity and cellulose content of about 6% to 10% each, such as are usually requisite for the manufacture of artificial silk, films, and other ultimate products. It is evidently the case that the effect of the oxidant used in the pretreatment is to lower the solution viscosity of the cellulose and thereby to increase its reactivity sufficiently to enable its substantially complete xanthation and dissolution even in the presence of the reaction products of the oxidant. In this connection, it might be noted that, although sodium chloride is one of the reaction products of sodium hypochlorite, which is the oxidant preferred for the purposes hereof, the sodium chloride does not militate against a satisfactory consummation of the one-step xanthating reaction even when the sodium chloride is present in the viscose syrup in amount as substantial as 2% to 10%, based on cellulose. This is in contradistinction to the usual viscose-making process wherein care is taken to use caustic soda solution practically free from sodium chloride for the purpose of preparing alkali cellulose. In the usual viscose-making process, the infusion along with the caustic soda solution of about 2% to 10% sodium chloride, based on cellulose, into the cellulose pulp, for instance, the sulphite pulp, used as raw material, detracts from the desired mercerizing activity of the strong caustic soda solution with which such pulp is impregnated to form the alkali cellulose that undergoes shredding and ageing preparatory to xanthation; and such an amount of sodium chloride also renders the alkali cellulose unduly resistant to complete xanthation and dissolution, in consequence of which the resulting viscose is of comparatively poor filterability and stability.

In practicing the process hereof, various kinds of cellulose fiber or wood pulps may be used as raw material, including ordinary sulphite pulp, wood pulp refined to high alpha cellulose content, say, upwards of 93%, cotton linters, etc. Assuming that the usual sulphite wood pulp in the form of pulpboard is used as raw material, the process hereof may be carried out substantially as follows. The pulpboard is cut into small pieces or chips and then put into a mixing and reacting vessel, as described in my application Serial No. 58,539, filed January 10, 1936. Caustic soda solution containing dissolved therein about 6% to 10% sodium hypochlorite bleach, based on the bone-dry weight of the pulp, is also added to the vessel. When the viscose to be prepared is desired for rayon manufacture, the caustic soda solution containing the hypochlorite may be of a caustic soda concentration of about 10% to 18% and be admixed with the pulpboard chips in volume calculated to yield a finished cellulose xanthate solution of a cellulose and caustic soda content each falling within the range of 6% to 10%. A typical case would involve the use of such caustic soda solution containing the hypochlorite in volume calculated to yield viscose of a cellulose content of 7.4% and a causticity of 6.5%. After the chips have been thoroughly soaked with the solution, they may be thoroughly disintegrated or defiberized to form a suspension of fiber substantially free from fiber clumps or aggregates in the treating solution. During the soaking and/or disintegration of the pulp chips, it is advantageous to heat the mixture of pulp and solution to a temperature of about 40° to 50° C., since at such elevated temperature the hypochlorite is substantially consumed in a period of about one to two hours by reaction upon the pulp. Otherwise, a much longer reacting period is required for substantial exhaustion of the hypochlorite. For instance, at a temperature of about 20° C., the reaction period must be prolonged to about eight to ten hours in order to ensure the desired substantially complete exhaustion of the hypochlorite in reacting upon the pulp and reducing its solution viscosity to the desired degree. Assuming the performance of a soaking and/or disintegration of the pulp chips in the treating solution at elevated temperature, the resulting fiber suspension in caustic soda solution containing little residual hypochlorite is then cooled, as by circulating cooling water or other suitable cooling medium through the jacket of the mixing and reacting vessel. If desired, the cooling may be effected in part by adding to the fiber suspension cool diluting water in volume calculated to yield viscose of the desired final composition.

Once the fiber suspension has been cooled to a temperature appropriate for the xanthating reaction, say, about 15° to 20° C., liquid carbon bisulphide is added thereto in amount necessary for the xanthating reaction, for instance, in the amount of about 35% to 40%, based on the bone-dry weight of the cellulose, and the mixed ingredients are subjected to the agitation and tumbling action conducive to the formation of the desired viscose or cellulose xanthate solution in a comparatively short period of time. Once the viscose or xanthate solution has been prepared, it may be diluted with water to the desired end-point, assuming that this was not done prior to the xanthating reaction. It is thus seen that the xanthating reaction hereof takes place in a cellulose fiber or wood pulp suspension containing the sodium chloride resulting as a reaction product of sodium hypochlorite, since no step is taken to remove the reaction products of the sodium hypochlorite previously expended by reaction on the cellulose fiber suspension.

The particular procedure hereinbefore described lends itself to modification in various respects. For instance, the cellulose fiber or wood pulp chips need not necessarily be treated with a hypochlorite or other oxidant solution containing all the caustic soda to participate in the xanthating reaction. Indeed, the caustic soda solution containing sodium hypochlorite with which the cellulose fiber is pretreated may furnish only part of the caustic soda entering into the xanthating reaction; and, after the hypochlorite has been substantially consumed by reaction on the fiber, the rest of the caustic soda to participate in the xanthating reaction may be added to the fiber suspension in the pretreating solution. When such a two-stage addition of caustic soda to the fiber is effected, it is preferable that the first-stage addition to the fiber be caustic soda solution containing not only the oxidant but also most or substantially all of the water to participate in the xanthating reaction; and, in such case, the second-stage addition may be caustic soda solution far more concentrated than the pretreating solution containing the oxidant. By using most or practically all of the water to enter into the xanthating reaction in the pretreating solution, it is possible to soak and disintegrate wood pulp chips in a shorter period of time; and the action of the sodium hypochlorite or other oxidant on the fiber is more rapid and its exhaustion is more quickly effected at a given temperature by reason of the lower causticity or concentration of the pretreating solution and, accordingly, the lower retardant effect of caustic soda on the activity of the hypochlorite or other oxidant. The xanthating reaction hereof may be promoted by providing in the sphere of reaction a volatile organic liquid miscible with both the carbon bisulphide and the caustic soda solution, as fully disclosed in my application Serial No. 148,304, filed June 15, 1937. For instance, as indicated in that application, acetone or its equivalent may be added in an amount of, say, about 10%, based on the weight of the carbon bisulphide to be used as a xanthating reagent; and the resulting liquid mixture may be admixed in appropriate amount with cellulose fiber in suspension pretreated accordant with the invention hereof. The acetone or its equivalent as thus used, being miscible with both the caustic soda solution and the carbon bisulphide, induces quick and substantially uniform diffusion of the carbon bisulphide through the caustic soda solution to the individual cellulose fibers or cellulose particles suspended in the solution, in consequence of which the xanthating reaction is promoted to yield viscose syrup of relatively very low content of incompletely xanthated or unxanthated cellulose.

It is possible to use in the pretreatment hereof solutions of oxidants other than sodium hypochlorite, for instance, solutions of such oxidants as hydrogen peroxide, sodium peroxide, permanganates, perchlorates, etc., but sodium hypochlorite is, as already indicated, preferred both because it is a relatively low cost oxidant and because its reaction products do not adversely affect in significant measure the qualities desired in the finished viscose or cellulose xanthate solution.

I claim:

1. A process of preparing cellulose xanthate solution, which comprises treating cellulose fiber with a solution of an oxidant, continuing the treatment until the oxidant is substantially consumed, and, in the presence of substantially all the oxidant reaction products, treating the fiber admixed with caustic soda solution in the form of substantially individualized fiber suspension with carbon bisulphide to form a cellulose xanthate solution.

2. A process of preparing cellulose xanthate solution, which comprises forming a suspension of cellulose fiber in caustic soda solution containing an oxidant, maintaining the fiber suspension under time and temperature conditions to cause the oxidant to expend itself substantially completely by reaction on the fiber, and, in the presence of substantially all the oxidant reaction products, treating the fiber suspension containing the fiber in substantially individualized condition with caustic soda solution and carbon bisulphide to form a cellulose xanthate solution.

3. A process of preparing cellulose xanthate solution, which comprises forming a suspension of cellulose fiber in caustic soda solution containing sodium hypochlorite, maintaining the fiber suspension under time and temperature conditions to cause the hypochlorite to exhaust itself substantially completely by reaction on the fiber, and, in the presence of substantially all the sodium hypochlorite reaction products, treating the fiber suspension containing the fiber in substantially individualized condition with carbon bisulphide to form a cellulose xanthate solution.

4. A process of preparing cellulose xanthate solution, which comprises forming a suspension of cellulose fiber in caustic soda solution containing an oxidant, maintaining the fiber suspension under time and temperature conditions to cause the oxidant to expend itself substantially completely by reaction on the fiber, adding more caustic soda to the fiber suspension containing the oxidant reaction products, and, in the presence of substantially all the oxidant reaction products, treating the fiber suspension containing the fiber in substantially individualized condition with carbon bisulphide to form a cellulose xanthate solution.

5. A process of preparing cellulose xanthate solution, which comprises forming a suspension of cellulose fiber in caustic soda solution containing soda hypochlorite, maintaining the fiber suspension under time and temperature conditions to cause the hypochlorite to expend itself substantially completely by reaction on the fiber, adding more caustic soda to the fiber suspension containing the hypochlorite reaction products, and, in the presence of substantially all the hypochlorite reaction products, treating the fiber suspension containing the fiber in substantially individualized condition with carbon bisulphide to form a cellulose xanthate solution.

6. A process of preparing cellulose xanthate solution, which comprises forming a suspension of cellulose fiber in relatively dilute caustic soda solution containing sodium hypochlorite, maintaining the fiber suspension under time and temperature conditions to cause the hypochlorite to expend itself substantially completely by reaction on the fiber, adding more concentrated caustic soda solution to the fiber suspension containing the hypochlorite reaction products, and, in the presence of substantially all the hypochlorite reaction products, treating the fiber suspension containing the fiber in substantially individualized condition with carbon bisulphide to form a cellulose xanthate solution.

7. A process of preparing cellulose xanthate solution, which comprises treating cellulose fiber with a solution of an oxidant until the oxidant is substantially consumed; and, in the presence of substantially all the oxidant reaction products and also an organic liquid miscible with both carbon bisulphide and caustic soda solution, treating the fiber in the form of a substantially individualized fiber suspension in the pretreating solution with carbon bisulphide and caustic soda solution to form cellulose xanthate solution.

8. A process of preparing cellulose xanthate, which comprises treating cellulose fiber with caustic soda solution containing sodium hypochlorite until the sodium hypochlorite is substantially consumed; and, in the presence of substantially all the hypochlorite reaction products and acetone, treating the fiber in the form of a substantially individualized fiber suspension in the pretreating solution with carbon bisulphide to form cellulose xanthate.

9. A cellulose xanthate solution containing cellulose and caustic soda in the amount of 6% to 10% each and the reaction products of sodium hypochlorite and cellulose, including as part of said reaction products about 2% to 10% of sodium chloride, based on the weight of cellulose.

10. A cellulose xanthate solution containing dissolved therein free caustic soda, the reaction products of an oxidant and cellulose, and a volatile organic liquid miscible both with caustic soda solution and carbon bisulphide.

11. A cellulose xanthate solution containing dissolved therein free caustic soda, the reaction products of sodium hypochlorite and cellulose, and acetone.

GEORGE A. RICHTER.